US011458956B2

United States Patent
Kim

(10) Patent No.: US 11,458,956 B2
(45) Date of Patent: Oct. 4, 2022

(54) DRIVING ASSISTANCE DEVICE OF VEHICLE CONNECTED TO TRAILER, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Hyun Su Kim, Uiwang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 218 days.

(21) Appl. No.: 16/742,621

(22) Filed: Jan. 14, 2020

(65) Prior Publication Data

US 2021/0039632 A1 Feb. 11, 2021

(30) Foreign Application Priority Data

Aug. 9, 2019 (KR) .......................... 10-2019-0097721

(51) Int. Cl.
*B60W 30/045* (2012.01)
*B60W 10/18* (2012.01)
*B60W 10/20* (2006.01)

(52) U.S. Cl.
CPC .......... *B60W 30/045* (2013.01); *B60W 10/18* (2013.01); *B60W 10/20* (2013.01);
(Continued)

(58) Field of Classification Search
CPC .... B60W 30/045; B60W 10/18; B60W 10/20; B60W 2552/40; B60W 2300/14;
(Continued)

(56) References Cited

U.S. PATENT DOCUMENTS 7,447,585 B2 * 11/2008 Tandy, Jr. ............. B60T 8/1708
701/70
8,682,560 B2 * 3/2014 Meyers ................ B60W 10/04
701/78
(Continued)

FOREIGN PATENT DOCUMENTS

JP 2019116140 A * 7/2019
KR 10-2016-0139457 A 12/2016
KR 10-1734245 B1 5/2017

OTHER PUBLICATIONS

Machine translation of JP-2019116140-A (Year: 2019).*

*Primary Examiner* — Nicholas Kiswanto
*Assistant Examiner* — Mohamad O El Sayah
(74) *Attorney, Agent, or Firm* — Morgan, Lewis & Bockius LLP

(57) ABSTRACT

A driving assistance device of a vehicle connected to a trailer, a vehicle system including the same, and a method thereof are provided. The vehicle driving assistance device includes a processor that determines a driving situation and a braking situation of a vehicle towing a trailer based on vehicle's internal signals and determines an amount of rear wheel steering control and an amount of braking control based on the driving situation and the braking situation of the vehicle and a storage storing the amount of rear wheel steering control and the amount of braking control, determined by the processor, and the vehicle's internal signals.

15 Claims, 11 Drawing Sheets

(52) U.S. Cl.
CPC ..... *B60W 2300/14* (2013.01); *B60W 2520/10* (2013.01); *B60W 2520/105* (2013.01); *B60W 2520/125* (2013.01); *B60W 2520/14* (2013.01); *B60W 2540/10* (2013.01); *B60W 2540/18* (2013.01); *B60W 2552/40* (2020.02); *B60W 2710/18* (2013.01); *B60W 2710/20* (2013.01)

(58) Field of Classification Search
CPC ....... B60W 2520/10; B60W 2520/105; B60W 2520/125; B60W 2520/14; B60W 2540/10; B60W 2540/18; B60W 2710/18; B60W 2710/20
See application file for complete search history.

(56) References Cited

U.S. PATENT DOCUMENTS

| | | | |
|---|---|---|---|
| 2006/0229782 A1* | 10/2006 | Deng | B62D 6/003 |
| | | | 701/42 |
| 2007/0152424 A1* | 7/2007 | Deng | B62D 53/005 |
| | | | 280/432 |
| 2018/0009421 A1* | 1/2018 | Albright | B60T 7/20 |
| 2018/0178788 A1* | 6/2018 | Ikedo | B60W 30/18154 |
| 2019/0375404 A1* | 12/2019 | Maleki | B60W 40/09 |
| 2020/0139822 A1* | 5/2020 | Kaneko | B60W 30/18127 |

* cited by examiner

DRIVING ASSISTANCE DEVICE OF VEHICLE CONNECTED TO TRAILER, SYSTEM INCLUDING THE SAME, AND METHOD THEREOF

CROSS-REFERENCE TO RELATED APPLICATION

The present application claims the benefit of priority to Korean Patent Application No. 10-2019-0097721, filed on Aug. 9, 2019 in the Korean Intellectual Property Office, the entire disclosure of which is incorporated herein by reference.

TECHNICAL FIELD

The present disclosure relates to a driving assistance device of a vehicle connected to a trailer, a system including the same, and a method thereof, and more particularly, relates to driving control technologies capable of minimizing a change in yaw behavior of the vehicle connected to the trailer.

BACKGROUND

In general, when a vehicle connected to a trailer is traveling, the load distribution of goods loaded on the trailer is not accurately balanced and a load of the trailer leans to one side.

While the vehicle is traveling, particularly, when the load of the trailer leans to one side when the vehicle makes a turn, vibration occurs in the trailer. When such vibration increases, because there occurs the problem that the vehicle is overturned, a trailer stability assist (TSA) is developed to control the vibration caused by the trailer.

In the existing technology, a vehicle towing a trailer quickly detects fishtail in which the behavior of the towed trailer is released from side to side and performs braking control.

However, because the vehicle towing the trailer is more greatly changed in characteristics of turn behavior than a vehicle of a basic state (a state where the trailer is not towed), it may allow a user of the towed vehicle to have a sense of difference in driving and instability.

The concept of control is basically changed according to a vehicle speed in a conventional rear wheel steering (RWS). The RWS performs control in an opposite phase to front wheels to improve a turn capability of the vehicle in a low-speed region and performs control in the same phase as front wheels to ensure stability of the vehicle in a high-speed region. However, because a control strategy of the RWS is not changed according to whether the trailer is connected to the vehicle and because the vehicle towing the trailer is controlled in the same condition as the vehicle of the basic state, the vehicle towing the trailer increases in instability.

The above information disclosed in this Background section is only for enhancement of understanding of the background of the present disclosure, and should not be taken as acknowledgement that this information forms the prior art that is already known to a person skilled in the art.

SUMMARY

The present disclosure has been made to solve the above-mentioned problems occurring in the prior art while advantages achieved by the prior art are maintained intact.

According an aspect of the present disclosure, a driving assistance device of a vehicle connected to a trailer, a system including the same, and a method thereof can make it possible to distribute a yaw moment using rear a wheel steering control and a braking control when the vehicle towing the trailer makes a turn and can minimize vehicle behaviors changed by the trailer, thereby minimizing a sense of difference of a user and preventing instability of the vehicle behaviors.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle driving assistance device may include: a processor that determines a driving situation and a braking situation of a vehicle towing a trailer based on vehicle's internal signals and determines an amount of rear wheel steering control and an amount of braking control based on the driving situation and the braking situation of the vehicle; and a storage storing the amount of rear wheel steering control and the amount of braking control, the amounts being determined by the processor, and the vehicle's internal signals.

In an exemplary embodiment, the processor may determine the driving situation and the braking situation of the vehicle, when a vehicle speed among the vehicle's internal signals is less than a predetermined vehicle speed boundary value.

In an exemplary embodiment, the driving situation and the braking situation of the vehicle may include at least one of whether the vehicle makes a turn, an acceleration state of the vehicle, or a deceleration state of the vehicle.

In an exemplary embodiment, the processor may determine that the vehicle makes a turn, when a steering angle among the vehicle's internal signals is greater than a predetermined steering angle boundary value and when lateral acceleration among the vehicle's internal signals is greater than a predetermined lateral acceleration boundary value.

In an exemplary embodiment, when the vehicle makes a turn, the processor may determine whether the vehicle accelerates based on an amount of accelerator pedal depression of a user and a vehicle acceleration estimation value and may determine whether the vehicle decelerates based on an amount of braking of the user and a vehicle deceleration estimation value.

In an exemplary embodiment, the processor may determine an Ackerman yaw rate using a steering angle and a vehicle speed and may determine a target yaw rate using the Ackerman yaw rate and a road friction coefficient.

In an exemplary embodiment, the processor may determine a yaw rate error which is a difference value between the target yaw rate and a sensor yaw rate received from a sensor and may determine a target yaw moment based on the yaw rate error.

In an exemplary embodiment, when the vehicle is in a deceleration state, the processor may output the amount of rear wheel steering control and the amount of braking control when the target yaw moment is in a direction of decreasing a current yaw rate of the vehicle.

In an exemplary embodiment, when the vehicle is in an acceleration state, the processor may output the amount of rear wheel steering control and the amount of braking control when the target yaw moment is in the direction of increasing a current yaw rate of the vehicle.

In an exemplary embodiment, when the vehicle is in a deceleration situation, the processor may convert the target yaw moment into a rear wheel steering stroke, and may output the amount of braking control and the rear wheel steering stroke to perform additional braking control when the rear wheel steering stroke is greater than a predetermined maximum value of the rear wheel steering stroke.

In an exemplary embodiment, the processor may perform origin control of rear wheel steering when the vehicle is not in a deceleration situation and may determine and output an amount of braking control using the target yaw moment.

In an exemplary embodiment, the vehicle driving assistance device may further include a communicator that receives the vehicle's internal signals through controller area network (CAN) communication and transmits the amount of rear wheel steering control and the amount of braking control.

According to another aspect of the present disclosure, a vehicle system may include: a rear wheel steering (RWS) that controls rear wheel steering of a vehicle, a braking controller that controls braking of the vehicle. The vehicle system may further include a vehicle driving assistance device that determines a driving situation and a braking situation of a vehicle towing a trailer based on vehicle's internal signals, determines an amount of rear wheel steering control and an amount of braking control based on the driving situation and the braking situation of the vehicle, outputs the amount of rear wheel steering control to the RWS, and outputs the amount of braking control to the braking controller.

In an exemplary embodiment, the vehicle driving assistance device may determine the driving situation and the braking situation of the vehicle, when a vehicle speed among the vehicle's internal signals is less than a predetermined vehicle speed boundary value.

In an exemplary embodiment, the vehicle driving assistance device may determine whether the vehicle makes a turn using a steering angle and lateral acceleration among the vehicle's internal signals. When the vehicle makes a turn, the vehicle driving assistance device may determine whether the vehicle accelerates using an amount of accelerator pedal depression of a user and a vehicle acceleration estimation value and may determine whether the vehicle decelerates using an amount of braking of the user and a vehicle deceleration estimation value.

In an exemplary embodiment, the vehicle driving assistance device may determine an Ackerman yaw rate using a steering angle and a vehicle speed, may determine a target yaw rate using the Ackerman yaw rate and a road friction coefficient, may determine a yaw rate error which is a difference value between the target yaw rate and a sensor yaw rate received from a sensor, and may determine a target yaw moment based on the yaw rate error.

According to another aspect of the present disclosure, a vehicle driving assistance method may include: determining a driving situation and a braking situation of a vehicle towing a trailer based on vehicle's internal signals and determining an amount of rear wheel steering control and an amount of braking control based on the driving situation and the braking situation of the vehicle.

In an exemplary embodiment, the determining a driving situation and a braking situation of a vehicle may include determining whether the vehicle makes a turn using a steering angle and lateral acceleration among the vehicle's internal signals, determining whether the vehicle accelerates based on an amount of accelerator pedal depression of a user and a vehicle acceleration estimation value, when the vehicle makes a turn, and determining whether the vehicle decelerates using an amount of braking of the user and a vehicle deceleration estimation value.

In an exemplary embodiment, the determining an amount of rear wheel steering control and an amount of braking control may include determining an Ackerman yaw rate using a steering angle and a vehicle speed and determining a target yaw rate using the Ackerman yaw rate and a road friction coefficient and determining a yaw rate error which is a difference value between the target yaw rate and a sensor yaw rate received from a sensor and determining a target yaw moment based on the yaw rate error.

In an exemplary embodiment, the determining an amount of rear wheel steering control and an amount of braking control further may include converting the target yaw moment into a rear wheel steering stroke when the vehicle is in a deceleration situation, and determining the amount of braking control and the rear wheel steering stroke to perform additional braking control when the rear wheel steering stroke is greater than a predetermined maximum value of the rear wheel steering stroke.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
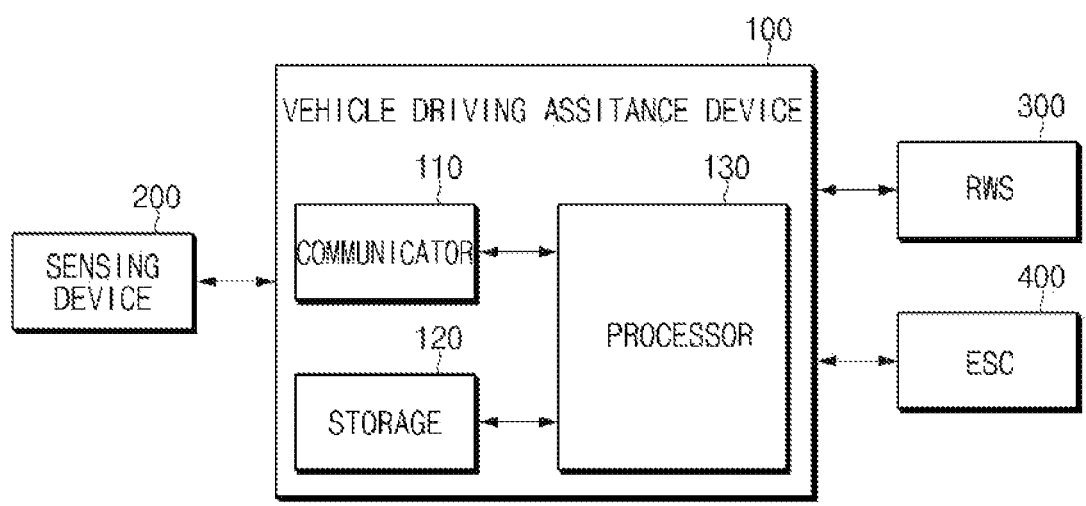
FIG. 1 is a block diagram illustrating a configuration of a vehicle system including a vehicle driving assistance device according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An exemplary embodiment of the present disclosure discloses a configuration capable of interlocking with a rear wheel steering (RWS) and an electronic stability control (ESC) when a vehicle towing a trailer makes a turn and controlling the vehicle to minimize a change in behavior of the vehicle to minimize a sense of difference of a user in driving and concurrently enhance turn stability of the vehicle.

Hereinafter, a description will be given in detail of embodiments of the present disclosure with reference to FIGS. 1 and 11.

Figure 2:
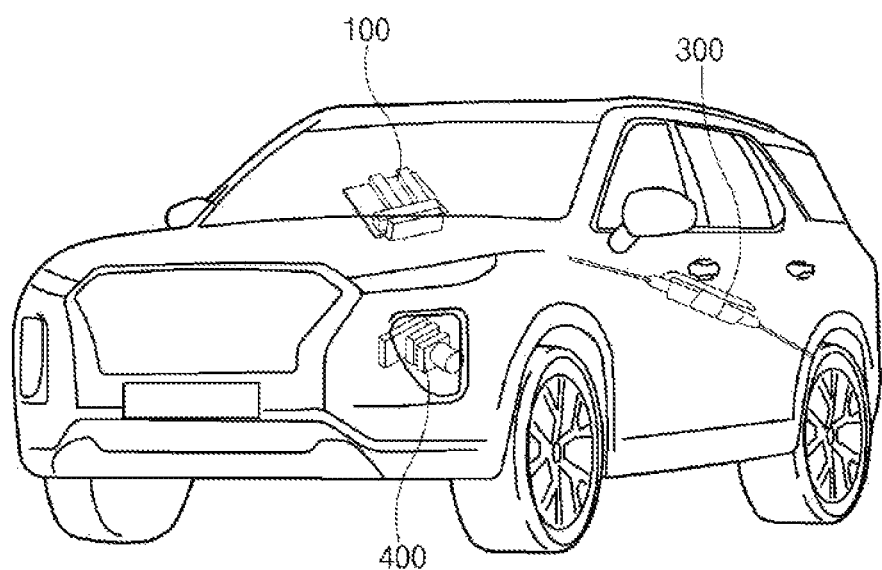
FIG. 2 is a drawing illustrating an example in which a vehicle driving assistance device is loaded into a vehicle, according to an exemplary embodiment of the present disclosure.

FIG. 1 is a block diagram illustrating a configuration of a vehicle system including a vehicle driving assistance device according to an exemplary embodiment of the present disclosure. FIG. 2 is a drawing illustrating an example in which a vehicle driving assistance device is loaded into a vehicle, according to an exemplary embodiment of the present disclosure.

Referring to FIG. 1, the vehicle system according to an exemplary embodiment of the present disclosure may include a vehicle driving assistance device 100, a sensing device 200, a rear wheel steering (RWS) 300, and an electronic stability control (ESC) 400.

Referring to FIG. 2, the vehicle driving assistance device 100, the RWS 300, and the ESC 400 may be loaded into a vehicle.

The vehicle driving assistance device 100 may determine a driving situation and a braking situation of a vehicle towing a trailer based on a vehicle's interval signal and may determine an amount of rear wheel steering control and an amount of braking control based on the driving situation and the braking situation of the vehicle. The vehicle driving assistance device 100 may transmit the amount of rear wheel steering control to the RWS 300 and may transmit the amount of braking control to the ESC 400.

To this end, the vehicle driving assistance device 100 may include a communicator 110, a storage 120, and a processor 130.

The communicator 110 may be a hardware device implemented by various electronic circuits, e.g., a processor, to transmit and receive signals via wireless or wired connections.

The communicator 110 may perform inter-vehicle communication through controller area network (CAN) communication, local interconnect network (LIN) communication, or the like and may communicate with the sensing device 200, the RWS 300, and the ESC 400. Particularly, the communicator 110 may transmit a stroke determined by the processor 130 to the RWS 300 and the ESC 400.

The storage 120 may store a sensing result of the sensing device 200, a vehicle's internal signal received through CAN communication, or an amount of rear wheel steering control or an amount of braking control, which is obtained by the processor 130, or a vehicle speed boundary value, a steering angle boundary value, a lateral acceleration boundary value, an accelerator position sensor (APS) boundary value, a braking amount boundary value, an acceleration boundary value, a deceleration boundary value, a target yaw rate, a target yaw moment, or the like, which is preset by an experimental value. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The processor 130 may be electrically connected with the communicator 110, the storage 120, or the like and may electrically control the respective components. The processor 130 may be an electrical circuit which executes instructions of software and may perform a variety of data processing and calculation described below.

The processor 130 may determine a driving situation and a braking situation of the vehicle towing the trailer based on vehicle's interval signals and may determine an amount of rear wheel steering control and an amount of braking control based on the driving situation and the braking situation of the vehicle.

When a vehicle speed among the vehicle's interval signals is less than a predetermined vehicle speed boundary value, the processor 130 may determine the driving situation and the braking situation of the vehicle. In this case, the driving situation and the braking situation of the vehicle may include at least one or more of whether the vehicle make a turn, an acceleration state of the vehicle, and/or a deceleration state of the vehicle.

When a steering angle among the vehicle's interval signals is greater than a predetermined steering angle boundary value and when lateral acceleration among the vehicle's interval signals is greater than a predetermined lateral acceleration boundary value, the processor 130 may determine that the vehicle makes a turn.

When the vehicle makes a turn, the processor 130 may determine whether the vehicle accelerates using an amount of accelerator pedal depression of a user and a vehicle acceleration estimation value and may determine whether the vehicle decelerates using an amount of braking of the user and a vehicle deceleration estimation value.

The processor 130 may determine an Ackerman yaw rate using a steering angle and a vehicle speed and may determine a target yaw rate using the Ackerman yaw rate and a road friction coefficient.

The processor 130 may determine a yaw rate error which is a difference value between the target yaw rate and a sensor yaw rate received from a sensor included in the sensing device 200 and may determine a target yaw moment based on the yaw rate error.

When the vehicle is in a deceleration state and when the target yaw moment is in the direction of decreasing a current yaw rate of the vehicle, the processor 130 may output the amount of rear wheel steering control and the amount of braking control.

When the vehicle is in an acceleration state and when the target yaw moment is in the direction of increasing the current yaw rate of the vehicle, the processor 130 may output the amount of rear wheel steering control and the amount of braking control.

When the vehicle is in a deceleration situation, the processor 130 may convert the target yaw moment into a rear wheel steering stroke. When the rear wheel steering stroke is greater than a predetermined maximum value of the rear wheel steering stroke, the processor 130 may output the amount of braking control and the rear wheel steering stroke to perform additional braking control.

When the vehicle is not in the deceleration situation, the processor 130 may perform origin control of rear wheel steering and may determine and output an amount of braking control using the target yaw moment.

The sensing device 200 may include a plurality of sensors for sensing a steering angle, lateral acceleration, longitudinal acceleration, a vehicle speed, a steering torque, and the like of the vehicle and may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

The RWS 300 and the ESC 400 of the vehicle according to an exemplary embodiment of the present disclosure may include at least one memory and at least one processor programmed to control operations of various components of the vehicle.

The RWS 300 may control rear wheel steering of the vehicle depending on the amount of rear wheel steering control received from the vehicle driving assistance device 100.

The ESC 400 may control braking of the vehicle depending on the amount of braking control received from the vehicle driving assistance device 100.

The vehicle driving assistance device 100 according to an exemplary embodiment of the present disclosure may receive and use a sensing result, such as a steering angle, lateral acceleration, longitudinal acceleration, a vehicle speed, or a steering torque of the vehicle, from the sensing device 200 and may receive a steering angle, lateral acceleration, longitudinal acceleration, a vehicle speed, a steering torque, a road friction coefficient, a deceleration estimation value, an acceleration estimation value, and the like of the vehicle, which are determined by devices in the vehicle rather than the sensing device 200.

As such, an exemplary embodiment of the present disclosure may minimize vehicle behavior capable of changing due to the connection of a trailer when a vehicle towing the trailer makes a turn, thus reducing a sense of difference the user may feel and preventing instability of the vehicle behavior.

Furthermore, the vehicle driving assistance device 100 according to an exemplary embodiment of the present disclosure may distribute a yaw moment using rear wheel steering control and braking control, thus minimizing a sense of difference the user may feel due to the control and assisting the user to safely tow a trailer in the same driving state. The corresponding function may enable a trailer mode to operate, thus enhancing merchantability according to a differentiation in vehicle driving mode.

Figure 3:
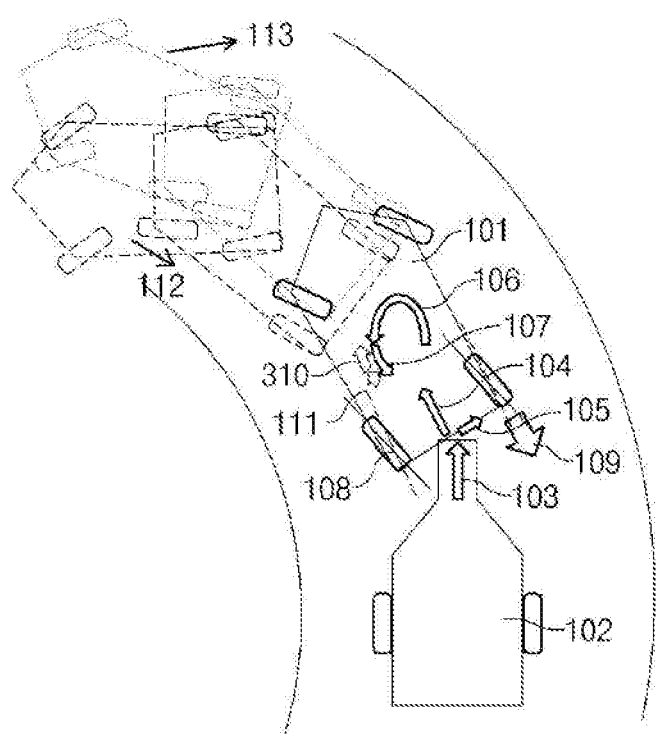
FIG. 3 is a drawing illustrating a deceleration situation due to throttle off when a vehicle connected to a trailer makes a turn, according to an exemplary embodiment of the present disclosure.

FIG. 3 is a drawing illustrating a deceleration situation (free rolling) due to throttle off when a vehicle connected to a trailer makes a turn, according to an exemplary embodiment of the present disclosure.

When a vehicle 101 towing a trailer 102 makes a turn, in a deceleration situation, an applied force 103 may occur at a hitch point between the trailer 102 and the towing vehicle 101 due to inertia of the trailer 102.

The force 103 may be divided into a longitudinal force 104 and a lateral force 105 on body fixed coordinates of the towing vehicle 101. In this case, the lateral force 105 may be applied to the outside of rear wheel turn of the towing vehicle 101, and a yaw rate may be more increased by an increase amount 107 than a basic yaw rate 106 of the vehicle 101, caused by steering of a user. The increase amount 107 may be regarded as the yaw rate error 107 of the vehicle 101 towing the trailer 102 as compared with a general vehicle.

A vehicle driving assistance device 100 according to an exemplary embodiment of the prevent disclosure may first control an RWS 300 of FIG. 1 in the same phase 108 through yaw rate feedback in such a situation. As the RWS 300 is controlled in the same phase, an amount of yaw rate error 107 may be reduced (see reference numeral 310).

According to the degree of turn of the vehicle 101, a value corresponding to the yaw rate error 107 may be increased. When the value is less than a certain reference value, the vehicle driving assistance device 100 may perform control using only the RWS 300.

On the other hand, when the value is greater than or equal to the certain reference value, the vehicle driving assistance device 100 may brake an outer wheel of rear wheel turn (see reference numeral 109) and may suppress occurrence of an additional yaw rate of the vehicle 101 (see reference numeral 111).

As such, when the occurrence of the additional yaw rate of the vehicle 101 is suppressed, because a behavior of the vehicle 101 may change from reference numeral 112 to reference numeral 113, the vehicle 101 may travel on a correct trajectory.

Figure 4:
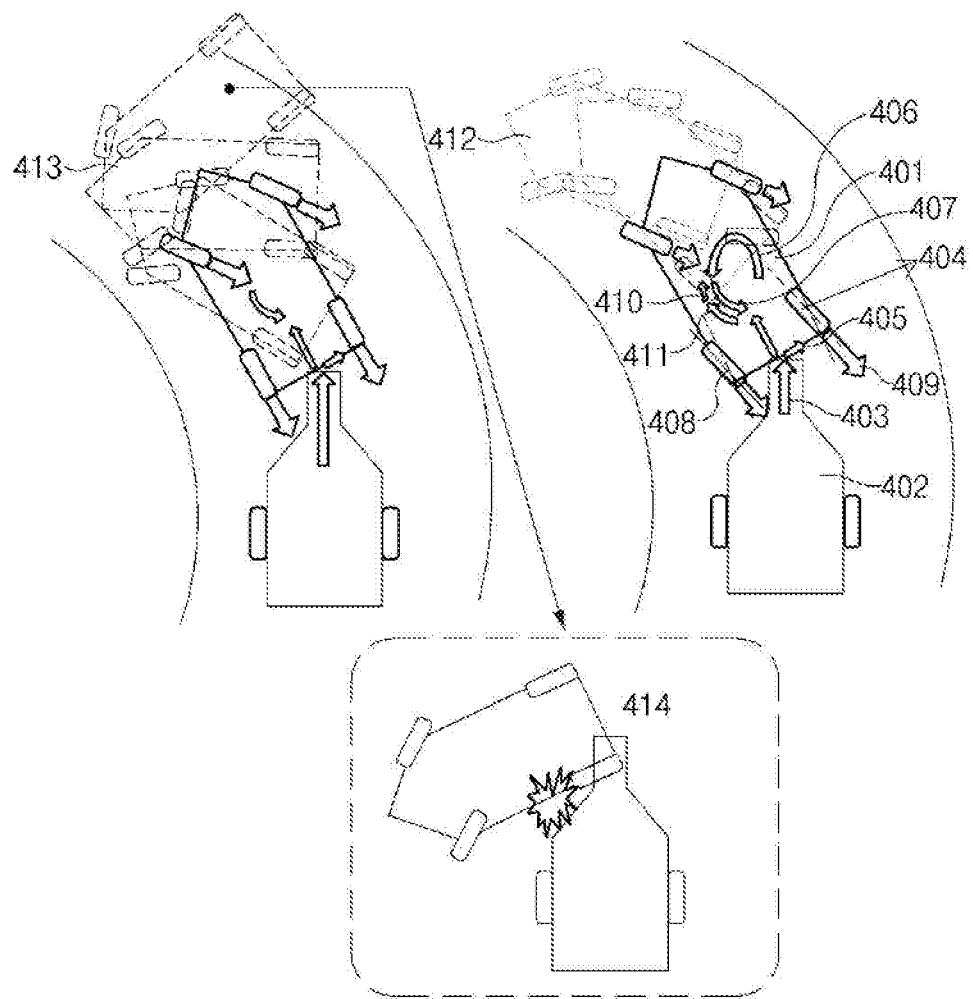
FIG. 4 is a drawing illustrating a strong braking situation when a vehicle connected to a trailer makes a turn, according to an exemplary embodiment of the present disclosure.

FIG. 4 is a drawing illustrating a strong braking situation when a vehicle connected to a trailer makes a turn, according to an exemplary embodiment of the present disclosure.

When a vehicle 401 towing a trailer 402 makes a turn, in a deceleration situation, an applied force 403 may occur at a hitch point between the trailer 402 and the towing vehicle 401 due to inertia of the trailer 402.

The force 403 may be divided into a longitudinal force 404 and a lateral force 405 on body fixed coordinates of the towing vehicle 401. In this case, the lateral force 405 may be applied to the outside of rear wheel turn of the towing vehicle 401, and a yaw rate may be more increased by an increase amount 407 than a basic yaw rate 406 of the vehicle 401. The increase amount 407 may be regarded as the yaw rate error 407 of the vehicle 401 towing the trailer 402 as compared with a general vehicle.

A vehicle driving assistance device 100 of FIG. 1 may control an RWS 300 of FIG. 1 in the same phase 408 through yaw rate feedback in such a situation and may more distribute a braking force to an outer wheel of rear wheel turn (reference numeral 409). In this case, the vehicle driving assistance device 100 may control an amount 408 of control of the RWS 300 to a maximum value depending on a braking degree and an amount of deceleration and may then perform braking control using feedback control based on a yaw rate error (see reference numeral 409).

When the control is performed, a yaw rate of the vehicle 401 may be stabilized due to rear wheel steering and braking control (see reference numerals 410 and 411) and a trajectory of the vehicle 401 may change from reference numeral 413 to reference numeral 412.

As such, when the control according to an exemplary embodiment of the present disclosure is performed, a jackknife phenomenon 414 in which the towing vehicle 401 and the trailer 402 are folded at the hitch point may be prevented in the situation while turning.

Figure 5:
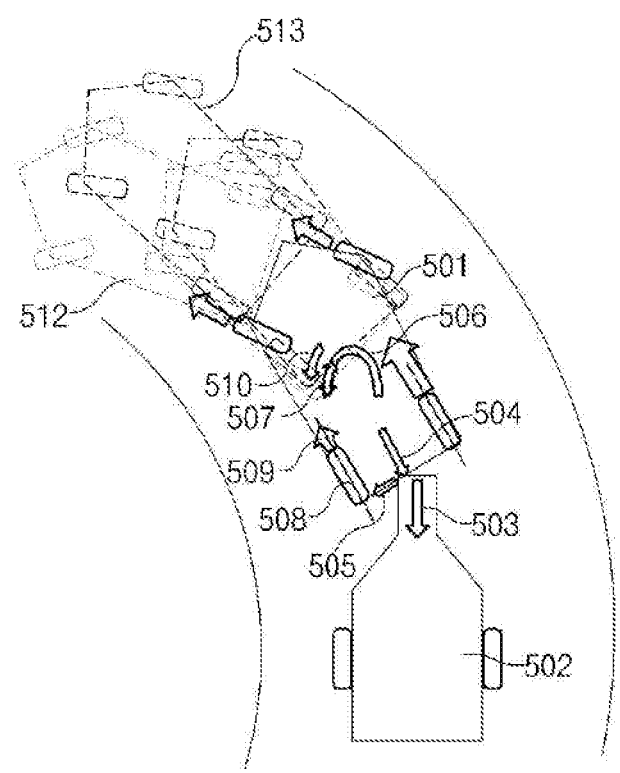
FIG. 5 is a drawing illustrating a situation where engine output is output by acceleration and vehicle speed keeping when a vehicle connected to a trailer makes a turn, according to an exemplary embodiment of the present disclosure.

FIG. 5 is a drawing illustrating a situation (throttle on) where engine output is output by acceleration and vehicle speed keeping when a vehicle connected to a trailer makes a turn, according to an exemplary embodiment of the present disclosure.

When a vehicle 501 towing a trailer 502 makes a turn, in an acceleration situation, an applied force 503 may occur at a hitch point between the trailer 502 and the towing vehicle 501 due to inertia of the trailer 502.

The force 503 may be divided into a longitudinal force 504 and a lateral force 505 on body fixed coordinates of the towing vehicle 501. In this case, the lateral force 505 may be applied to the inside of rear wheel turn of the towing vehicle 501, and a yaw rate may be more decreased by a decrease amount 507 than a basic yaw rate 506 of the vehicle 501, caused by steering of a user. The decrease amount 507 may be regarded as the yaw rate error 507 of the vehicle 501 towing the trailer 502 as compared with a general vehicle.

A vehicle driving assistance device 100 of FIG. 1 may perform control in the direction of applying a braking force to a turn inner rear wheel and more generating a yaw moment through yaw rate feedback in such a situation (see reference numeral 509) and may reduce an amount of yaw rate error 507 (see reference numeral 510).

In this case, the vehicle driving assistance device 100 may control a rear wheel steering angle at the origin (see reference numeral 508) to prevent a situation where the vehicle 501 becomes unstable when controlled in an opposite phase.

Because of performing the control, a behavior of the vehicle 501 may change from reference numeral 513 to reference numeral 512 such that the vehicle 501 travels on a correct trajectory.

Figure 6:
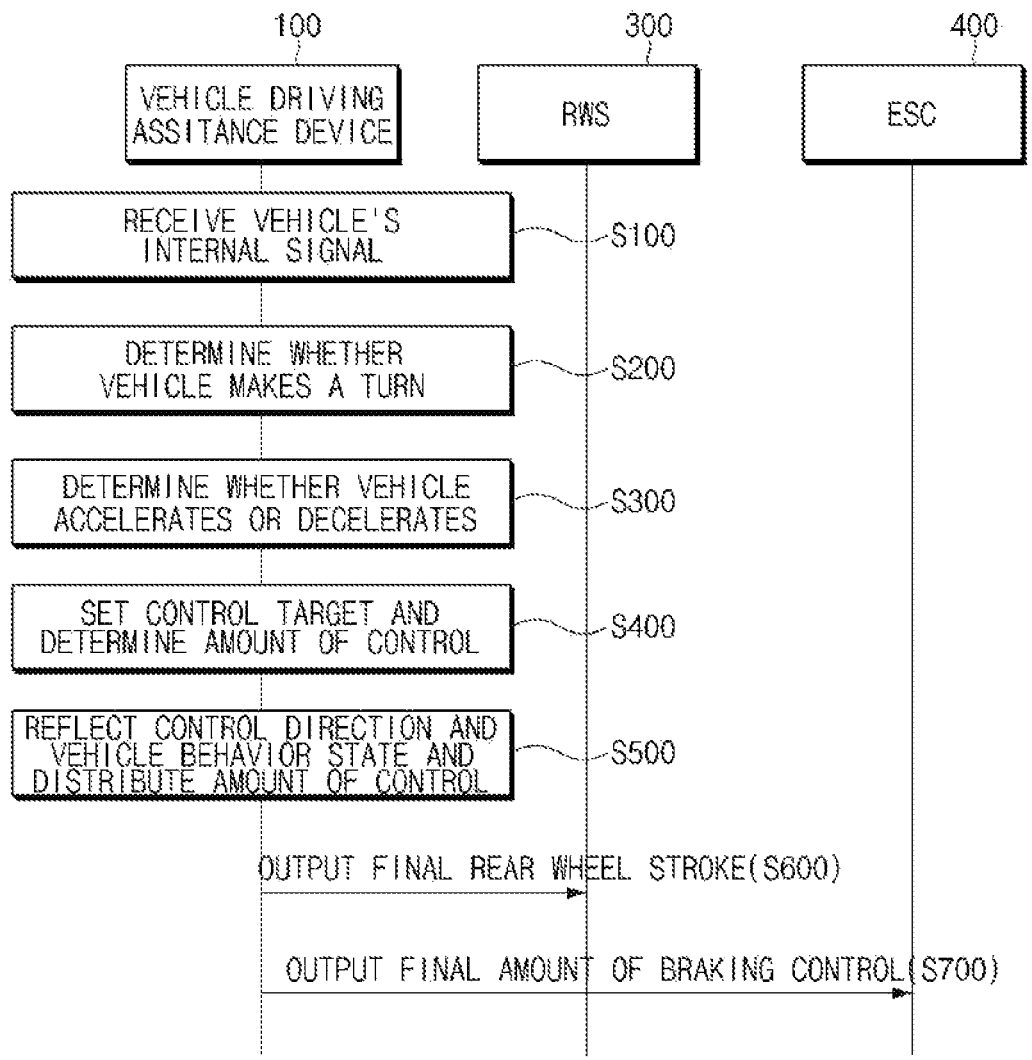
FIG. 6 is a signal sequence diagram illustrating a driving assistance method of a vehicle connected to a trailer according to an exemplary embodiment of the present disclosure.

Hereinafter, a description will be given of a driving assistance method of a vehicle connected to a trailer according to an exemplary embodiment of the present disclosure with reference to FIG. 6. FIG. 6 is a signal sequence diagram illustrating a driving assistance method of a vehicle connected to a trailer according to an exemplary embodiment of the present disclosure.

When a vehicle is started and when a trailer mode is turned on by manipulation of a user, in S100, a vehicle driving assistance device 100 may recognize a trailer using a vehicle sensing device 200 of FIG. 1.

In S200, the vehicle driving assistance device 100 may determine whether the vehicle is making a turn based on a vehicle's internal signal. When the vehicle is making a turn, in S300, the vehicle driving assistance device 100 may determine whether the vehicle is in an acceleration or deceleration state to adjust a change in behavior.

In S400, the vehicle driving assistance device 100 may determine a target yaw moment which is a control target depending on the acceleration or deceleration state of the vehicle and may determine an amount of rear wheel control for rear wheel steering and an amount of braking control.

In S500, the vehicle driving assistance device 100 may reflect a control direction and a vehicle behavior state and may distribute an amount of control. In other words, the vehicle driving assistance device 100 may determine whether to perform rear wheel steering control, whether to add braking control, or the like without braking control depending on a deceleration situation or an acceleration situation.

In S600, the vehicle driving assistance device 100 may output a final rear wheel stroke determined by such distribution of the amount of control to an RWS 300. In S700, the vehicle driving assistance device 100 may output a final amount of braking control to an ESC 400.

Hereinafter, a description will be given in detail of a driving assistance method of a vehicle connected to a trailer according to an exemplary embodiment of the present disclosure with reference to FIGS. 7 to 10. In this case, hereinafter, it is assumed that a vehicle driving assistance device 100 of FIG. performs processes of FIGS. 7 to 10. Furthermore, in descriptions of FIGS. 7 to 10, an operation described as being performed by an apparatus may be understood as being controlled by a processor 130 of the vehicle driving assistance device 100.

Figure 7:
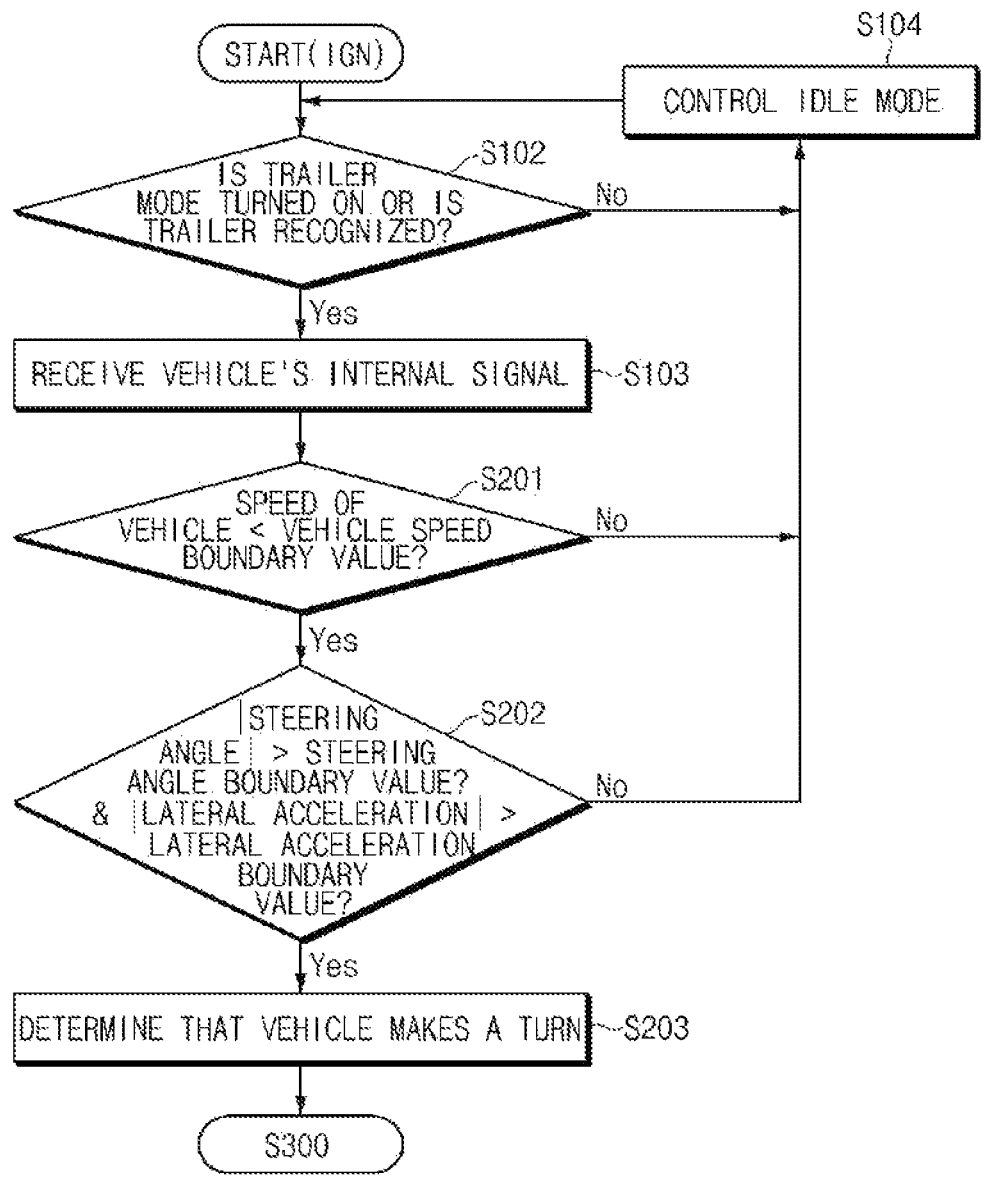
FIG. 7 is a flowchart illustrating a detailed process of determining whether a vehicle makes a turn in FIG. 6, according to an exemplary embodiment of the present disclosure.

FIG. 7 is a flowchart illustrating a detailed process S200 of determining whether a vehicle makes a turn in FIG. 6, according to an exemplary embodiment of the present disclosure.

Referring to FIG. 7, after a vehicle is started (an ignition is on), in S102, an apparatus may determine whether a trailer mode is turned on or whether a trailer is connected to the vehicle.

When the trailer mode is turned on or when the trailer is connected the vehicle, in S103, the apparatus may receive vehicle's internal signals from a sensing device 200 of FIG. 1 and devices in the vehicle through CAN communication. In this case, the vehicle's internal signals may include a steering angle, a yaw rate, a vehicle speed, lateral acceleration, an accelerator position sensor (APS) signal, master cylinder pressure (MasterP), and the like. Furthermore, the vehicle driving assistance device 100 may determine a minimum vale and a maximum value among the vehicle's internal signals received through CAN communication and may cancel noise using a first low pass filter (LPF).

Meanwhile, when the trailer mode is turned off or when the trailer is not connected to the vehicle, in S104, the apparatus may enter a vehicle idle mode.

In S201, the apparatus may determine whether a vehicle speed is less than a vehicle speed boundary value. In this case, the vehicle speed boundary value may be preset by an experimental value.

When the vehicle speed is greater than or equal to the vehicle speed boundary value (in a high-speed region), in S104, the apparatus may enter the control idle mode. Because instability of the vehicle should first be controlled in the high-speed region (of the vehicle speed boundary value or more) and it differs from the purpose of minimizing a sense of difference in towing a trailer, proposed in an exemplary embodiment of the present disclosure, the apparatus may perform control according to an exemplary embodiment of the present disclosure at a certain vehicle speed or less.

When the vehicle speed is less than the vehicle speed boundary value, in S202, the apparatus may determine whether the vehicle make a turn using a steering angle. In other words, when an absolute value of the steering angle is greater than a predetermined steering angle boundary value and when a lateral when a lateral acceleration value measured in the vehicle is greater than a predetermined lateral acceleration boundary value, in S203, the apparatus may determine that the vehicle makes a turn. In this case, the steering angle boundary value and the lateral acceleration boundary value may be preset by experimental values.

On the other hand, when the absolute value of the steering angle is less than or equal to the predetermined steering angle boundary value or when the lateral acceleration value measured in the vehicle is less than or equal to the predetermined lateral acceleration boundary value, in S104, the apparatus may enter the control idle mode. In the control idle mode, a rear wheel steering angle may be on the basis of 0-degree control and braking may be on the basis of non-control.

Figure 8:
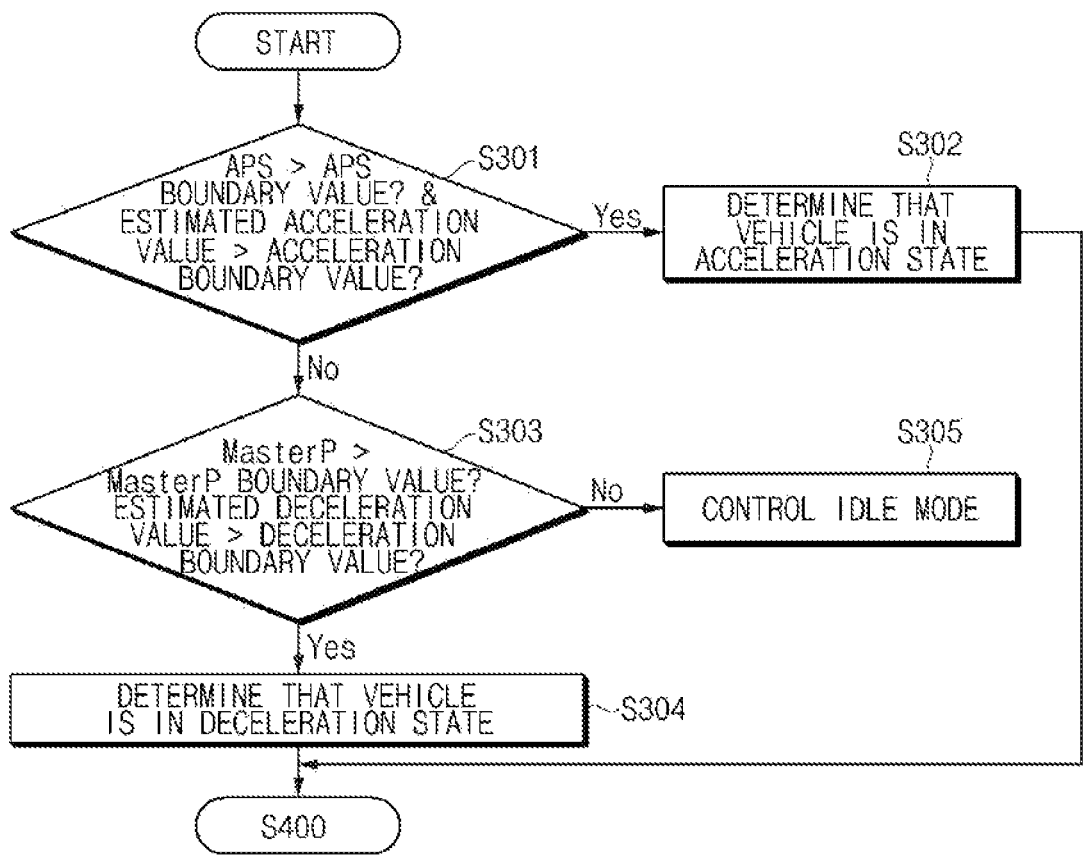
FIG. 8 is a flowchart illustrating a detailed process of determining whether a vehicle accelerates and decelerates in FIG. 6, according to an exemplary embodiment of the present disclosure.

FIG. 8 is a flowchart illustrating a detailed process S300 of determining whether a vehicle accelerates and decelerates in FIG. 6, according to an exemplary embodiment of the present disclosure.

After determining whether a vehicle makes a turn in FIG. 7, in S301, an apparatus may determine whether the vehicle accelerates or decelerates. In other words, when an amount of accelerator pedal depression (APS) of a user is greater than a predetermined APS boundary value and when a value corresponding to estimated acceleration is greater than a predetermined acceleration boundary value, in S302, the apparatus may determine that the vehicle is in an acceleration state. In this case, the estimated acceleration may be determined based on a differential value of a vehicle speed.

On the other hand, when the amount of accelerator pedal depression (APS) is less than or equal to the predetermined APS boundary value or when the value corresponding to the estimated acceleration is less than or equal to the predetermined acceleration boundary value, the apparatus may determine a deceleration state. In other words, in S303, the apparatus may determine whether a value corresponding to an amount of braking (masterP) of the user is greater than a predetermined masterP boundary value and whether a value corresponding to estimated deceleration is greater than a predetermined deceleration boundary value. When the value corresponding to the amount of braking (masterP) of the user is greater than the predetermined masterP boundary value and when the value corresponding to the estimated deceleration is greater than the predetermined deceleration boundary value, in S304, the apparatus may determine that the vehicle is in the deceleration state. In this case, the estimated deceleration may be determined in a general manner of estimating deceleration.

Meanwhile, when the amount of braking (masterP) of the user is less than or equal to the predetermined masterP boundary value or when the value corresponding to the estimated deceleration is less than or equal to the predetermined deceleration boundary value, in S305, the apparatus may enter a control idle mode.

Figure 9:
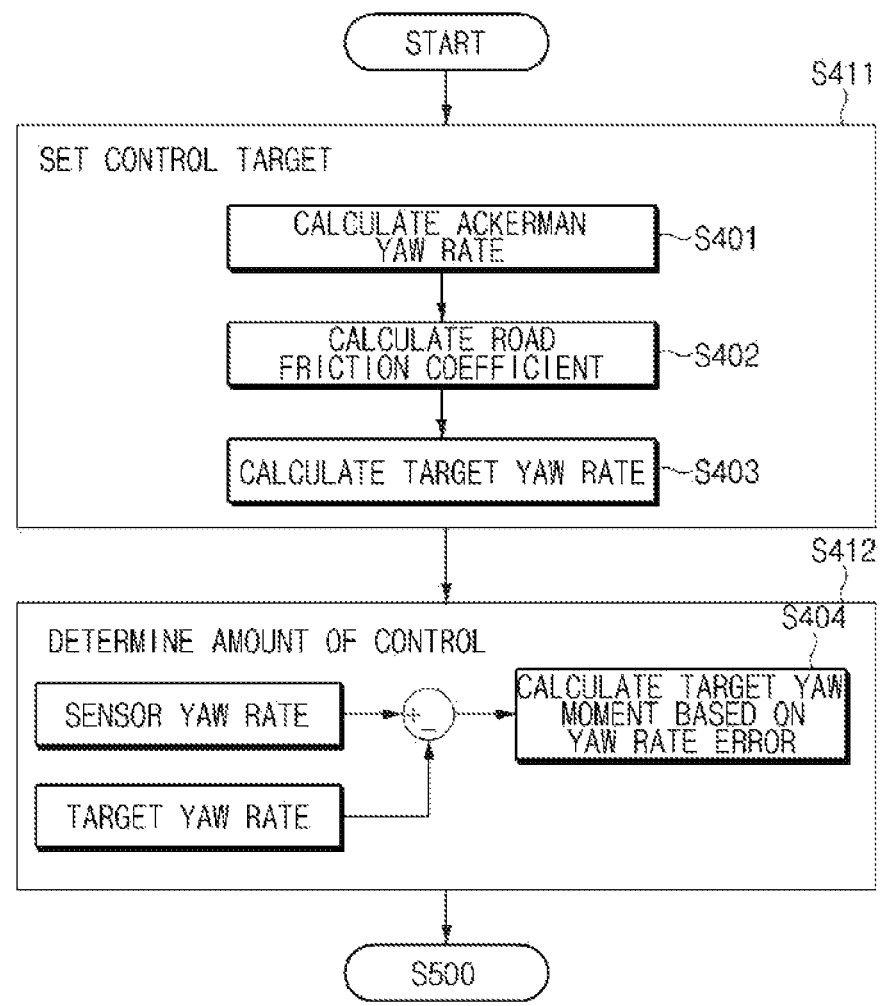
FIG. 9 is a flowchart illustrating a detailed process of setting a control target and a detailed process of determining an amount of control in FIG. 6, according to an exemplary embodiment of the present disclosure.

FIG. 9 is a flowchart illustrating a detailed process S411 of setting a control target and a detailed process S412 of determining an amount of control in FIG. 6, according to an exemplary embodiment of the present disclosure.

Referring to FIG. 9, in S401, an apparatus may determine an Ackerman yaw rate using a steering angle and a vehicle speed. In S402, the apparatus may determine a road friction coefficient. In S403, the apparatus may reflect a road friction coefficient estimation value to limit a maximum value of the Ackerman yaw rate and may determine a target yaw rate. In this case, the apparatus may determine the Ackerman yaw rate on the basis of a basic amount of rear wheel steering control when there is no trailer, irrespective of a current stroke value of an RWS 300 of FIG. 1.

Furthermore, the apparatus may determine a target yaw rate on the basis of a previous control strategy of the RWS 300 of a vehicle. Moreover, the apparatus may set vehicle behavior when a trailer is not connected to the vehicle to a target yaw rate.

In S404, the apparatus may determine a yaw rate error from a difference between a sensor yaw rate received from a sensing device 200 of FIG. 1 and the target yaw rate determined in S403 and may determine a target yaw moment based on the yaw rate error. In this case, the apparatus may determine the target yaw moment using a proportional derivative (PD) (or proportional integral derivative (PID)) controller. In this case, PID control may be a kind of feedback control such that an output of the system maintains a reference voltage based on an error between a control variable and a reference input and may be a combination of proportional control, proportional-integral control, and proportional-derivative control. In other words, the proportional control may be to multiply an error signal between a reference signal and a current signal by a suitable proportional constant gain to generate a control signal. The proportional-integral control may be to connect and use integral control of integrating an error signal to generate a control signal to proportional control in parallel. The proportional-derivative control may be to connect and use derivative control of differentiating an error signal to generate a control signal to proportional control in parallel.

Figure 10:
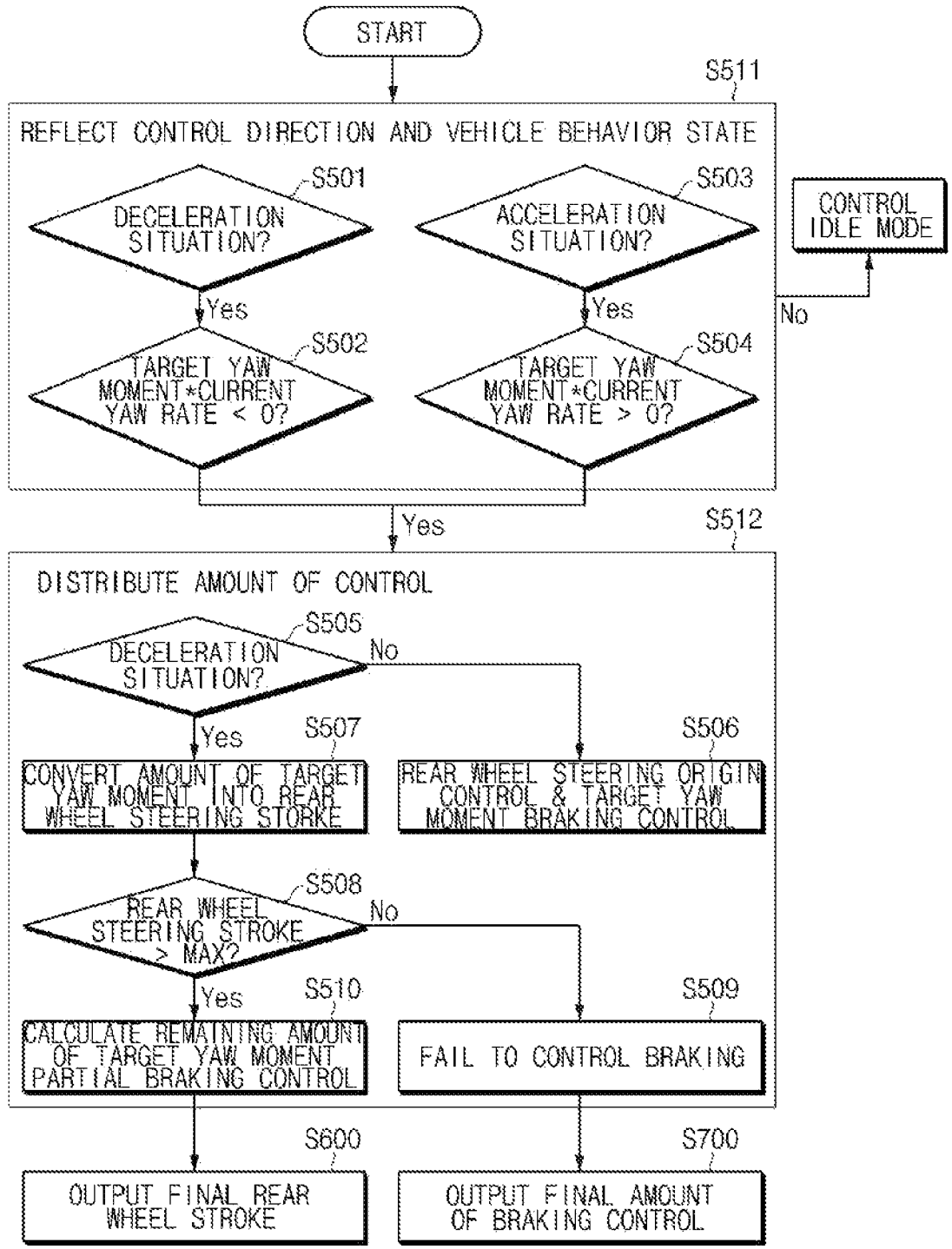
FIG. 10 is a flowchart illustrating a detailed process of reflecting a control direction and a vehicle behavior state and a detailed process of distributing an amount of control in FIG. 6, according to an exemplary embodiment of the present disclosure.

FIG. 10 is a flowchart illustrating a detailed process S511 of reflecting a control direction and a vehicle behavior state and a detailed process S512 of distributing an amount of control in FIG. 6, according to an exemplary embodiment of the present disclosure.

In S511, an apparatus may determine a restraint from the determined target yaw moment. First of all, in S501 and S503, the apparatus may determine whether a vehicle is currently in a deceleration situation or an acceleration situation.

In S502, the apparatus may identify a sign of a target yaw moment and a current yaw rate in the deceleration situation and may pass an amount of control only when the target yaw moment is in the direction of decreasing the current yaw rate.

In S504, the apparatus may pass an amount of control only when the target yaw moment is in the direction of increasing the current yaw rate in the acceleration situation.

In S512, the apparatus may distribute an amount of control to an RWS 300 and an ESC 400 of FIG. 1.

First of all, in S505, the apparatus may determine whether the vehicle is in a deceleration situation. When the vehicle is not in the deceleration situation, in S506, the RWS 300 may perform origin control. In this case, the determined target yaw moment may be controlled using only braking control.

When the vehicle is in the deceleration situation, an RWS 300 of FIG. 1 may proactively perform control. In S507, the apparatus may convert an amount of target yaw moment into a rear wheel steering stroke. When converting the amount of target yaw moment into the rear wheel steering stroke, in S508, the apparatus may determine the rear wheel steering stroke is greater than a maximum value max of the rear wheel steering stroke.

When the rear wheel steering stroke is less than or equal to the maximum value max of the rear wheel steering stroke, in S509, the apparatus may fail to control braking. When the rear wheel steering stroke is greater than the maximum value max of the rear wheel steering stroke, in S510, the apparatus may determine the remaining value of target yaw moment partial braking control and may perform additional braking control.

In S600 and S700, the apparatus may transmit a final rear wheel stroke and a final amount of braking control to the RWS 300 and the ESC 400, respectively, to perform steering and braking control of the vehicle.

As such, an exemplary embodiment of the present disclosure may minimize vehicle behavior capable of changing due to the connection of a trailer when a vehicle towing the trailer makes a turn, thus reducing a sense of difference the user may feel and preventing instability of the vehicle behavior.

Furthermore, an exemplary embodiment of the present disclosure may distribute a yaw moment using rear wheel steering control and braking control, thus minimizing a sense of difference the user may feel and assisting the user to safely tow a trailer in the same driving state. Furthermore, the corresponding function may enable a trailer mode to operate, thus enhancing merchantability according to a differentiation in vehicle driving mode.

Figure 11:
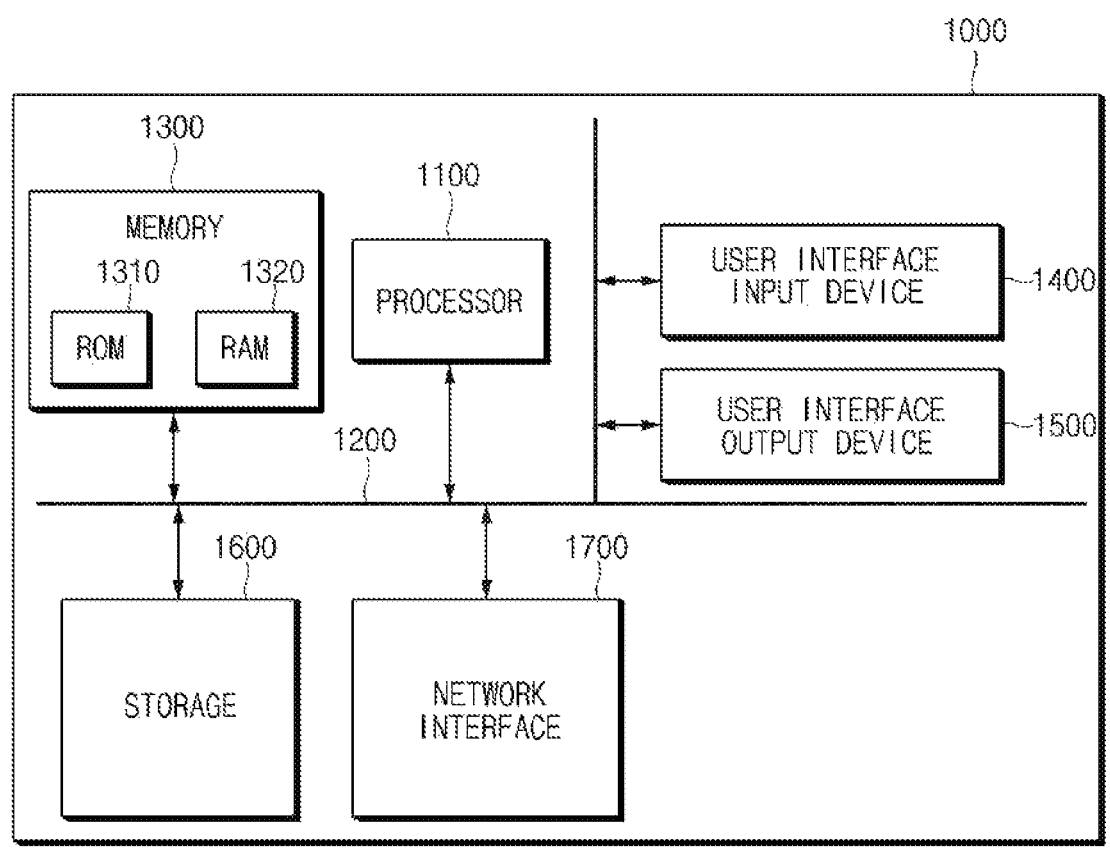
FIG. 11 is a block diagram illustrating a computing system according to an exemplary embodiment of the present disclosure.

FIG. 11 is a block diagram illustrating a computing system according to an exemplary embodiment of the present disclosure.

Referring to FIG. 11, a computing system 1000 may include at least one processor 1100, a memory 1300, a user interface input device 1400, a user interface output device 1500, storage 1600, or a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may distribute a yaw moment using rear wheel steering control and braking control when a vehicle towing a trailer makes a turn and may minimize vehicle behavior capable of changing due to the connection of the trailer, thus reducing a sense of difference of the user and preventing instability of the vehicle behavior.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle driving assistance device, comprising:
a processor configured to determine a driving situation and a braking situation of a vehicle towing a trailer based on vehicle's internal signals and to determine an amount of rear wheel steering control and an amount of braking control based on the driving situation and the braking situation of the vehicle; and
a storage storing the amount of rear wheel steering control and the amount of braking control, determined by the processor, and the vehicle's internal signals,
wherein the processor determines an Ackerman yaw rate using a steering angle and a vehicle speed and determines a target yaw rate using the Ackerman yaw rate and a road friction coefficient,
wherein the processor determines a yaw rate error which is a difference value between the target yaw rate and a sensor yaw rate received from a sensor, and determines a target yaw moment based on the yaw rate error, and
wherein, when the vehicle is in a deceleration state, the processor outputs the amount of rear wheel steering control and the amount of braking control when the target yaw moment is in a direction of decreasing a current yaw rate of the vehicle.

2. The vehicle driving assistance device of claim 1, wherein the processor determines the driving situation and the braking situation of the vehicle, when a vehicle speed among the vehicle's internal signals is less than a predetermined vehicle speed boundary value.

3. The vehicle driving assistance device of claim 1, wherein the driving situation and the braking situation of the vehicle include at least one of whether the vehicle makes a turn, an acceleration state of the vehicle, or a deceleration state of the vehicle.

4. The vehicle driving assistance device of claim 1, wherein the processor determines that the vehicle makes a turn, when a steering angle among the vehicle's internal signals is greater than a predetermined steering angle boundary value and when lateral acceleration among the vehicle's internal signals is greater than a predetermined lateral acceleration boundary value.

5. The vehicle driving assistance device of claim 1, wherein, when the vehicle makes a turn, the processor determines whether the vehicle accelerates based on an amount of accelerator pedal depression of a user and a vehicle acceleration estimation value, and determines whether the vehicle decelerates based on an amount of braking of the user and a vehicle deceleration estimation value.

6. The vehicle driving assistance device of claim 1, wherein, when the vehicle is in an acceleration state, the processor outputs the amount of rear wheel steering control and the amount of braking control when the target yaw moment is in a direction of increasing a current yaw rate of the vehicle.

7. The vehicle driving assistance device of claim 1, wherein, when the vehicle is in a deceleration situation, the processor converts the target yaw moment into a rear wheel steering stroke, and outputs the amount of braking control and the rear wheel steering stroke to perform an additional braking control when the rear wheel steering stroke is greater than a predetermined maximum value of the rear wheel steering stroke.

8. The vehicle driving assistance device of claim 1, wherein, when the vehicle is not in a deceleration situation, the processor performs an origin control of rear wheel steering and determines and outputs an amount of braking control using the target yaw moment.

9. The vehicle driving assistance device of claim 1, further comprising:
a communicator configured to receive the vehicle's internal signals through controller area network (CAN) communication and transmit the amount of rear wheel steering control and the amount of braking control.

10. A vehicle system, comprising:
a rear wheel steering (RWS) configured to control rear wheel steering of a vehicle;
a braking controller configured to control braking of the vehicle; and
a vehicle driving assistance device configured to determine a driving situation and a braking situation of a vehicle towing a trailer based on vehicle's internal signals, to determine an amount of rear wheel steering control and an amount of braking control based on the driving situation and the braking situation of the vehicle, to output the amount of rear wheel steering control to the RWS, and to output the amount of braking control to the braking controller,
wherein the vehicle driving assistance device determines an Ackerman yaw rate using a steering angle and a vehicle speed and determines a target yaw rate using the Ackerman yaw rate and a road friction coefficient,
wherein the vehicle driving assistance device determines a yaw rate error which is a difference value between the target yaw rate and a sensor yaw rate received from a sensor, and determines a target yaw moment based on the yaw rate error, and
wherein, when the vehicle is in a deceleration state, the vehicle driving assistance device outputs the amount of rear wheel steering control and the amount of braking control when the target yaw moment is in a direction of decreasing a current yaw rate of the vehicle.

11. The vehicle system of claim 10, wherein the vehicle driving assistance device determines the driving situation and the braking situation of the vehicle when a vehicle speed among the vehicle's internal signals is less than a predetermined vehicle speed boundary value.

12. The vehicle system of claim 10, wherein the vehicle driving assistance device determines whether the vehicle makes a turn using a steering angle and lateral acceleration among the vehicle's internal signals, and
wherein, when the vehicle makes a turn, the vehicle driving assistance device determines whether the vehicle accelerates based on an amount of accelerator pedal depression of a user and a vehicle acceleration estimation value and determines whether the vehicle decelerates based on an amount of braking of the user and a vehicle deceleration estimation value.

13. A vehicle driving assistance method, comprising:
determining a driving situation and a braking situation of a vehicle towing a trailer based on vehicle's internal signals; and
determining an amount of rear wheel steering control and an amount of braking control based on the driving situation and the braking situation of the vehicle,
wherein the determining an amount of rear wheel steering control and an amount of braking control includes:
determining an Ackerman yaw rate using a steering angle and a vehicle speed and determining a target yaw rate using the Ackerman yaw rate and a road friction coefficient;
determining a yaw rate error which is a difference value between the target yaw rate and a sensor yaw rate received from a sensor and determining a target yaw moment based on the yaw rate error; and
when the vehicle is in a deceleration state, outputting the amount of rear wheel steering control and the amount of braking control when the target yaw moment is in a direction of decreasing a current yaw rate of the vehicle.

14. The vehicle driving assistance method of claim 13, wherein the determining a driving situation and a braking situation of a vehicle includes:
determining whether the vehicle makes a turn based on a steering angle and lateral acceleration among the vehicle's internal signals;
determining whether the vehicle accelerates based on an amount of accelerator pedal depression of a user and a vehicle acceleration estimation value, when the vehicle makes a turn; and
determining whether the vehicle decelerates based on an amount of braking of the user and a vehicle deceleration estimation value.

15. The vehicle driving assistance method of claim 13, wherein the determining an amount of rear wheel steering control and an amount of braking control further includes:
converting the target yaw moment into a rear wheel steering stroke, when the vehicle is in a deceleration situation; and
determining the amount of braking control and the rear wheel steering stroke to perform an additional braking control, when the rear wheel steering stroke is greater than a predetermined maximum value of the rear wheel steering stroke.

* * * * *